Figure 1:
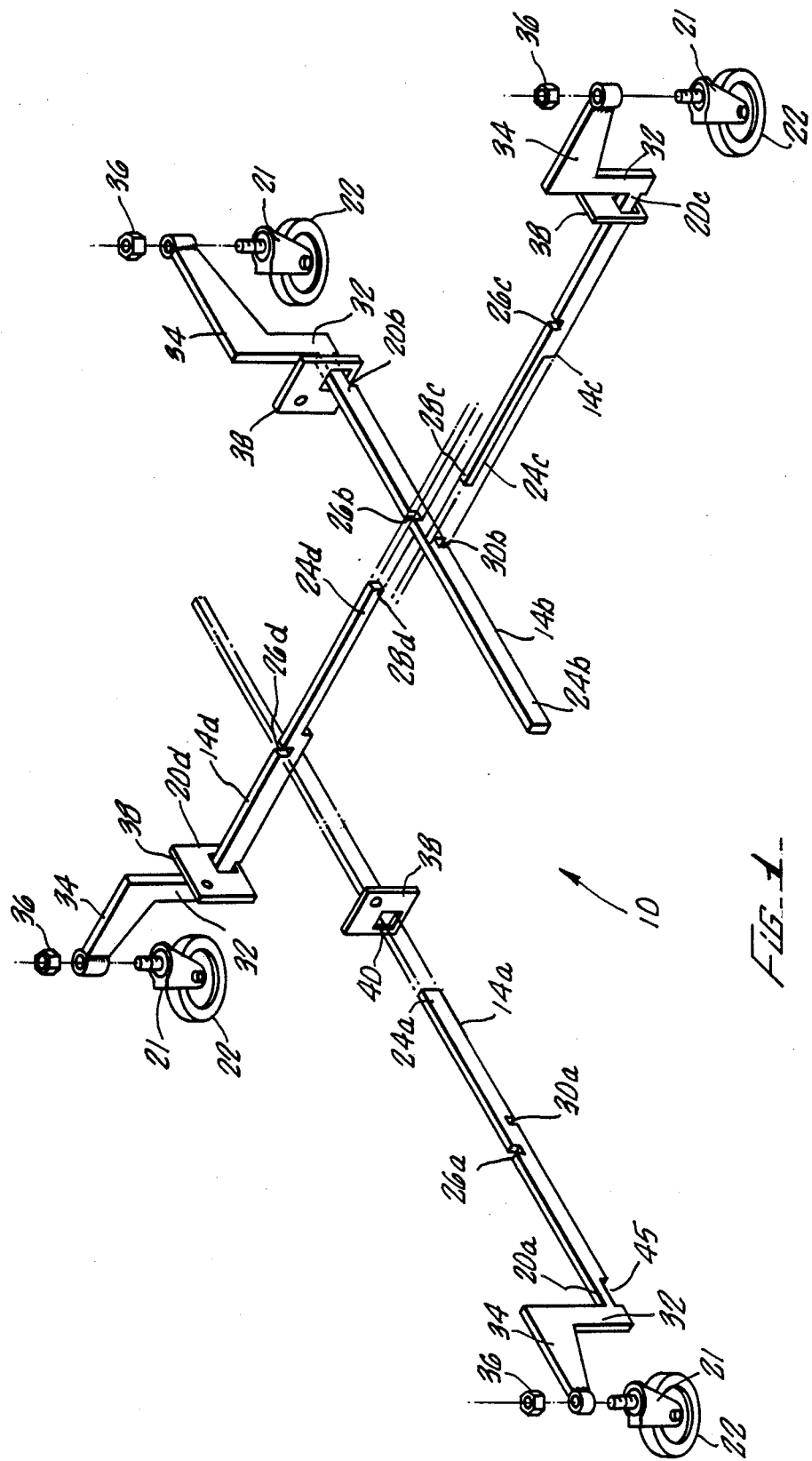

United States Patent [19]

Kaufmann

[11] Patent Number: 4,969,657
[45] Date of Patent: Nov. 13, 1990

[54] PIANO TRUCK

[76] Inventor: David W. Kaufmann, 1041 College, Claremont, Calif. 91711

[21] Appl. No.: 397,237

[22] Filed: Aug. 23, 1989

[51] Int. Cl.⁵ ............................................. B62D 21/12
[52] U.S. Cl. .................................. 280/79.11; 248/165
[58] Field of Search ..................... 280/638, 35, 47.34, 280/79.11, 79.3, 79.7; 248/165, 166, 172, 188.6, 187

[56] References Cited
U.S. PATENT DOCUMENTS

| 402,341 | 4/1889 | Martin | 280/79.11 |
| 4,220,347 | 9/1980 | Huntington | 280/79.11 |
| 4,743,039 | 5/1988 | Ellis | 280/79.11 |

OTHER PUBLICATIONS

Shaft Piano Supply Co. Catalog, 1973, pp. 25–28.
Photograph of a Piano Truck.

Primary Examiner—Charles A. Marmor
Assistant Examiner—Richard Camby
Attorney, Agent, or Firm—Jeffrey G. Sheldon

[57] ABSTRACT

A piano truck has a supporting structure comprising four elongated supports interconnected to form an adjustable parallelogram-shaped frame on which the piano can be supported. A wheel is mounted on each of the four supports so that no two wheels are colinear. The truck is compact and lightweight so that the piano can easily be maneuvered and transported through narrow doorways. Members are provided for fixedly attaching the supporting structure to a piano to avoid tipping over of the piano.

17 Claims, 2 Drawing Sheets

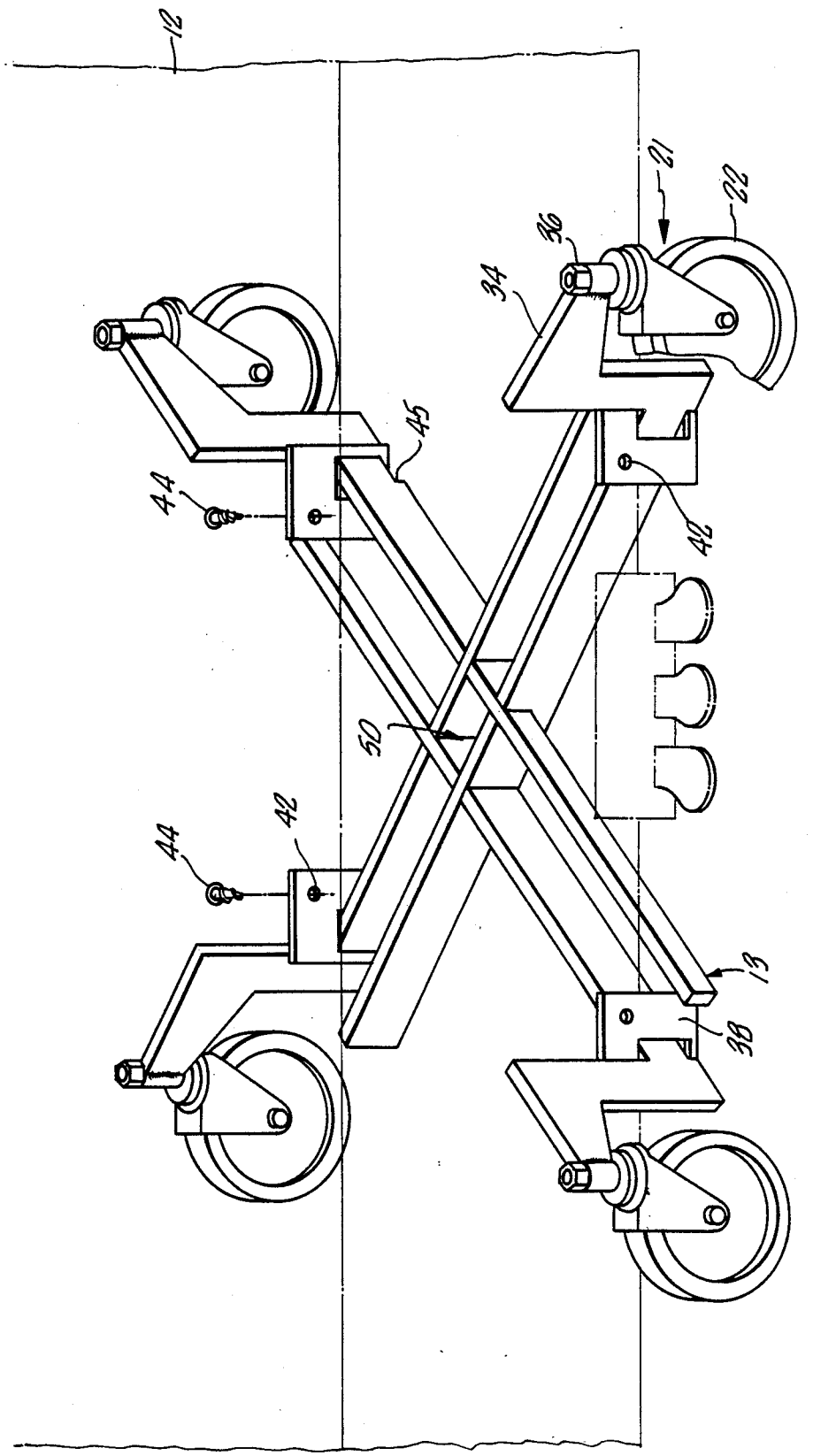

PIANO TRUCK

BACKGROUND

The present invention is directed to an apparatus for moving pianos.

It is often necessary to move pianos, particularly in institutional environments. For example, pianos are frequently moved about in hospitals, schools, and commercial establishments.

Because of this, in many institutions the piano is permanently maintained on a piano truck. The most popular piano truck for upright pianos is known as a Colson (brand) piano truck. This truck often has two elongated parallel tubes of adjustable length that fit longitudinally beneath the length of the piano, the tubes being connected at each end by a cradle on which the ends of the piano sit. Included are four wheels that are towards the corners of the piano. To accommodate pianos of varying width, the four corners of the device are provided with rubber bumpers and the position of the bumpers is adjusted depending upon the width of the piano.

This conventional Colson piano truck has many disadvantages. For example, the bulk of the weight of an upright piano is at the back, and since the rubber bumpers do not securely hold the piano, it is very easy to tip over the piano with resulting injuries.

Another disadvantage is that the Colson truck is fairly wide, having a width of over 33 inches, which means it cannot be used for transporting a piano through narrow doorways.

Another problem with the conventional Colson truck is that in going over cracks, such as in a sidewalk, often two of the wheels get caught in the crack, which can make it very difficult to move the piano, and sometimes results in tipping over of the piano.

Another problem with the Colson truck is that it is very bulky and heavy. Because of this bulk, it is difficult to maneuver the piano in tight places. For example, it is very difficult to turn the piano on its own center.

Accordingly, there is a need for a piano truck that is small in size and weight, securely attachable to the piano, sufficiently narrow to be used to transport pianos through narrow doorways, easily maneuverable, and that securely holds the piano so the piano is very difficult to tip over.

SUMMARY

The present invention is directed to an apparatus that satisfies this need. The apparatus comprises a supporting structure for the piano and wheels for moving the piano about. The supporting structure comprises four elongated supports for positioning partly underneath the piano. Each support has first and second end portions. The supporting structure includes means for interconnecting the supports to each other in two sets, a first set and a second set. The supports are interconnected so that each set comprises two substantially parallel supports spaced apart from each other with the first end portion of each support proximate to the second end portion of the other support of that set. In addition, the two sets of supports are transverse, preferably perpendicular, to each other. In other words, each support of the first set is transverse to each support of the second set. The supports thus form a parallelogram-shaped frame on which the piano can be supported.

A wheel is mounted on the first end portion of each support through mounting means. Because the two supports of each set are spaced apart from each other, the wheels of each set are not colinear with each other. Because of this wheel mounting configuration, it is less likely that two wheels at any one time will get caught in a crack in the sidewalk or the like.

The apparatus also includes means for attaching the supporting structure to a piano so that a wheel of the first set of supports and a wheel of the second set of supports are behind the piano, and a wheel of the first set of supports and a wheel of the second set of supports are proximate to the front of the piano. The wheels are thus near the middle of the piano rather than at the ends of the piano as is the case with the prior art truck. Because the wheels are near the center of the piano, it is easy to maneuver the piano, and in fact a piano can be turned on its own center with this apparatus.

Preferably the means for interconnecting the supports comprises means for adjusting the distance between the supports of the first set so that pianos of varied width can be accommodated. This can be effected by providing a notch in each support of the first set in which a respective support of the second set is slidingly mounted.

The attaching means can comprise a lug, attached to each support, and means for fixedly securing the lug to the piano. The lug can be a plate having an opening through which its respective support extends, the opening being sufficiently large that the plate can be canted on the support to fit substantially flat against the piano. The plate can be fixedly secured to the piano with a fastener extending through a hole in the plate. Each lug can be mounted on the support and prevented from sliding off of the support by the wheel mounting means.

DRAWINGS

These and other features, aspects, and advantages of the present invention will become better understood from the following description, appended claims, and accompanying drawings where:

FIG. 1 is a perspective view, partially exploded, of an apparatus for moving a piano according to the present invention; and FIG. 2 is a perspective view of the apparatus of FIG. 1, assembled, with a piano mounted thereon.

DESCRIPTION

As shown in FIGS. 1 and 2, a piano truck apparatus 10 according to the present invention is suitable for moving a conventional upright piano 12. The apparatus 10 comprises a supporting structure 13, which comprises four elongated supports or bars 14a, 14b, 14c, and 14d for positioning beneath the piano 12. Two of the supports 14a and 14b are sliding supports and are movable. Two of the supports are fixed supports 14c and 14d.

Each support 14 comprises a first end portion 20 for supporting a wheel or caster assembly 21 including a wheel 22 and a second end portion 24 interconnecting with the other supports to hold the piano 12.

The four supports are generally rectangular in transverse cross-section being formed from a rectangular bar stock. The second end portion of each support is generally an elongated, rectangular bar parallel to the floor. Each support 14 has a top notch 26 so the supports can be interconnected. Each top notch 26 is rectangular in cross-section and about half the height of the second end portion 24.

A forward portion 28 of each of the fixed supports 14c and 14d is only about half the height of the remainder of the second end portion 24 so that they can be mounted to slidingly engage the top notch 26 of the sliding supports 14a and 14b.

Each sliding support 14a and 14b has in its bottom surface a half-height, generally rectangular notch 30 for engaging a corresponding top notch 26 in one of the fixed bars 14c and 14d.

The first end portion 20 of each support has mounted thereon the wheel or caster assembly 21. The first end portion includes an upright mount 32 with a generally horizontal flange 34 extending therefrom from which the wheel assembly 21 depends. The wheel assembly can be held in place by a nut 36, or alternatively directly threaded into the flange 34. The bottom of the wheel 22 is below the bottom of the supports 14 so that the supports are slightly above the ground.

Each support 14 also includes a lug or a plate 38 for attachment to the piano 12. The plate 38 has a generally rectangular opening 40 therethrough so that the plate 40 can slide along the length of its respective support to a position up against the mount 32. The plate 38 has a fastener hole 42 with an associated fastener such as a screw 44 for holding the plate against the piano casing. An anchor (not shown) can be provided in the piano to securely hold the fastener 44.

Each support 14 has a cutout section 45 at its bottom adjacent the mount 32 to accommodate its plate 38. The rectangular opening 40 of each plate 38 is sufficiently large that the plate 38 can be canted on the support 14 to fit substantially flat against the piano 12 as shown in FIG. 2.

The supports 14 are interconnected to each other so that the two sliding supports 14a and 14b are substantially parallel to each other and spaced apart from each other. The two sliding supports 14a and 14b are oriented in opposite directions so that the first end portion 20a of the support 14a is proximate to the second end portion 24b of the sliding support 14b, and vice versa. Similarly, the fixed supports 14c and 14d are substantially parallel to each other, and spaced apart from each other, with the first end portion 20c of the fixed support 14c being proximate to the second end portion 24d of fixed support 14d, and vice versa.

Each sliding support 14a and 14b is transverse, and preferably perpendicular to each fixed support 14c and 14d, and each fixed support 14c and 14d is transverse and generally perpendicular to each sliding support 14a and 14b so that the supports 14a and 14b form a parallelogram-shaped frame 50 upon which the piano can be supported. When the supports are perpendicular relative to each other, the frame 50 is rectangular.

When the apparatus 10 is used, the sliding support 14a is interconnected to the fixed support 14d by means of the top notch 26d of the sliding support 14d interlocking with the bottom notch 30a of the fixed support 14a. Sliding support 14a engages the second fixed support 14c by having the forward portion 28c of fixed support 14c slidingly mounted in the top notch 26a of the fixed support 14a. Similarly, sliding support 14b is fixedly attached to fixed support 24c with the bottom notch 30b of the sliding support 14b interlocking with the top notch 26c of the fixed support 24c. Sliding support 14b slidingly engages fixed support 14d by having the forward portion 28d of fixed support 14d slidingly mounted in the top notch 26d of sliding support 14b.

Because of this sliding engagement, the distance between the two sliding supports 14a and 14b can be varied to accommodate pianos of varying widths.

When the four supports are in the desired position underneath the piano, the piano is fixedly attached to the apparatus by inserting the fasteners 44 through the respective plates 38 securely into the piano 12.

One of the significant advantages of the apparatus 10 is that, because it is rigidly attached to the piano, it securely holds the piano on the truck apparatus 10. This makes it very difficult to tip over the piano, because the truck itself has to be tipped over.

Another advantage of the present invention is that the wheels are not colinear or aligned, but are offset from each other. This makes it easier to go over cracks in sidewalks or to go from a tiled surface to a carpeted surface than with devices where the wheels are colinear.

As best shown in FIG. 2, when the piano is mounted on the frame, all the wheels are near the center of the piano, with two of the wheels actually below the keyboard portion of the piano, and two of the wheels behind the piano. Because of this configuration, the overall width of a piano mounted on the apparatus 10 is only about 5 inches greater than the width of the piano by itself. Thus, it is possible to move the piano through narrow doorways.

Moreover, because all the wheels are near the center of the piano, the piano can be easily turned, including around its own center.

Another advantage of the device is that it is compact and lightweight; a very heavy duty metal version that can easily accommodate a piano weighing about 23 pounds. Moreover, the device is compact, with each of the supports being about 2 feet in length.

A preferred wheel or caster is the swivel type, 5 inches in size and provided with a steel axle and a steel sleeve. In a preferred version of the invention, the caster wheels that are used are from Faultless Caster Co. of Evansville, Indiana, Part No. G4921513B.

Although the present invention has been described in considerable detail with reference to certain preferred versions thereof, other versions are possible. Therefore, the spirit and scope should not be limited to the description of the preferred versions contained herein.

I claim:

1. Apparatus for moving a piano having a front and back comprising:
    (a) a supporting structure comprising:
        (i) four elongated supports for positioning partly underneath the piano, each support having opposed first and second end portions; and
        (ii) means for interconnecting the supports to each other in first and second sets, each set comprising two substantially parallel supports spaced apart from each other with the first end portion of each support proximate to the second end portion of the other support of that set, each support of the first set being transverse to each support of the second set so that the supports form a parallelogram-shaped frame upon which the piano can be supported;
    (b) a wheel on the first end portion of each support and mounting means for mounting the wheel so that a piano supported by the supports can easily be moved, the wheels mounted on the first set of supports defining a line not being colinear with the longitudinal axis of any of the supports and the wheels mounted on the second set of supports defining a line not being colinear with the longitudinal axis of any of the supports and (c) means for attaching the supporting structure to a piano so that one wheel of the first set and one wheel of the second set are behind the piano and one wheel of the first set and one wheel of the second set are proximate to the front of the piano.

2. The apparatus of claim 1 wherein each support of the first set is perpendicular to each support of the second set, whereby the frame is rectangular.

3. The apparatus of claim 1 in which the means for interconnecting comprises means for adjusting the distance between the supports of the first set of supports for adjusting the overall size of the apparatus for supporting pianos of varying width.

4. The apparatus of claim 3 in which the interconnecting means comprises a notch in each support of the first set, in which a respective support of the second set is slidingly mounted in the notch.

5. The apparatus of claim 1 in which the means for attaching comprises a lug attached to each support and means for fixedly securing the lug to the piano.

6. The apparatus of claim 5 in which the lug is longitudinally adjustable along a portion of the length of its respective support.

7. The apparatus of claim 6 in which each lug comprises a plate having an opening through which its respective support extends, the opening being sufficiently large that the plate can be canted on the support to fit substantially flat against the piano.

8. The apparatus of claim 7 in which each lug is mounted on the first end portion of its respective support, and wherein the wheel mounting means keeps the lug from sliding off the first end portion of the support.

9. The apparatus of claim 8 in which the plate has at least one hole therethrough, and the means for fixedly securing the lug to the piano comprises a fastener extending through the hole into the piano.

10. The apparatus of claim 6 in which each lug is mounted on the first end portion of its respective support, and wherein the wheel mounting means keeps the lug from sliding off the first end portion of the support.

11. The apparatus of claim 1 in which the width of the supporting structure is less only slightly elevated off the ground.

12. The apparatus of claim 10 in which the first end portion of each support comprises an elevated section from which the respective wheel depends.

13. The apparatus of claim 1 in which the first end portion of each support comprises an elevated section from which the respective wheel depends.

14. The apparatus of claim 1 in which the maximum width of the supporting structure is less than the width of the piano.

15. Apparatus for moving a piano having a front and a back comprising:

(a) a supporting structure comprising:
(i) four elongated supports for positioning at least partly underneath the piano, each support having opposed first and second end portions; and
(ii) means for interconnecting the supports to each other in first and second sets, each set comprising two substantially parallel supports spaced apart from each other with the first end portion of each support proximate to the second end portion of the other support of that set, each support of the first set being perpendicular to each support of the second set so that the supports form a rectangular-shaped frame on which the piano can be supported, the interconnecting means including a notch in each support of the first set sized to receive in sliding engagement the second end portion of a respective support of the second set for adjusting the overall size of the apparatus for supporting pianos of varying width, the first end portion of each support also comprising an elevated section;

(b) a wheel depending from the elevated section of each support so that a piano supported by the supports can easily be moved the wheels mounted, on the first set of supports defining a line not being colinear with the longitudinal axis of any of the supports and the wheels mounted on the second set of supports defining a line not being colinear with the longitudinal axis of any of the supports and (c) a plate mounted on the first end portion of each support adjacent the elevated section, the plate having an opening through which its respective support extends, the opening being sufficiently large that the plate can be canted on the support to fit substantially flat against a piano, and fastening means for fixedly attaching each plate to the piano.

16. In combination, a piano truck and an upright piano mounted thereon for easy movement comprising:

(a) a supporting structure comprising:
(i) four elongated supports positioned partly underneath the piano, each support having opposed first and second end portions; and
(ii) means for interconnecting the supports to each other in first and second sets, each set comprising two substantially parallel supports spaced apart from each other with the first end portion of each support proximate to the second end portion of the other support of that set, each support of the first set being transverse to each support of the second set so that the supports from a parallelogram-shaped frame upon which the piano can be supported;

(b) a wheel on the first end portion of each support and mounting means for mounting the wheel so that the piano can easily be moved, the wheels mounted on the first set of supports defining a line not being colinear with the longitudinal axis of any of the supports and the wheels mounted on the second set of supports defining a line not being colinear with the longitudinal axis of any of the supports and (c) means for attaching the supporting structure to the piano so that one wheel of the first set and one wheel of the second set are behind the piano near the center thereof and one wheel of the first set and one wheel of the second set are proximate to the front of the piano beneath the keyboard.

17. The combination of claim 16 in which the means for attaching comprise a plate having an opening through which its respective support extends, the plate being slidingly mounted on the its respective support, the opening being sufficiently large that the plate is canted on the support and is pressed to substantially flat against the piano, and a fastener extending through the plate and into the piano.

* * * * *